3,467,669
SUBSTITUTED-1-p-CHLOROBENZOYL-2-METHYL-5-METHOXY-3-INDOLYLACETIC ACIDS
John Martin Chemerda, Watchung, and Meyer Sletzinger, North Plainfield, N.J., assignors to Merck & Co., Inc., Rahway, N.J., a corporation of New Jersey
No Drawing. Filed July 26, 1967, Ser. No. 656,038
Int. Cl. C07d 27/56
U.S. Cl. 260—326.12
1 Claim

ABSTRACT OF THE DISCLOSURE

This invention relates to compounds of the formula

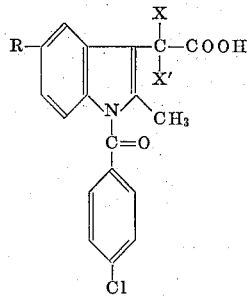

wherein X is chloro, bromo or tosyloxy and X¹ is hydrogen, chloro, or bromo, which compounds are useful as intermediates in the preparation of 1-p-chlorobenzoyl-2-methyl-5-methoxy-3-indolylacetic acid.

---

This invention relates to a new method of preparing certain 1-benzoyl-2-methyl-3-indolylacetic acid derivatives. More particularly, it relates to a method of preparing a 1-p-chlorobenzoyl-2-methyl-3-indolylacetic acid derivative of Formula I:

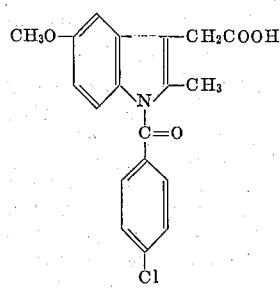

This compound is disclosed and claimed in U.S. Patent 3,161,654, issued Decmebr 15, 1964, to Shen.

In the Shen patent, 1-p-chlorobenzoyl-2-methyl-3-indolylacetic acids are prepared by a series of reactions in which 2-methyl-3-indolylacetic acid is dehydrated to the corresponding anhydride; the anhydride is treated with t-butyl alcohol to give the corresponding ester; the t-butyl ester is then acylated at the 1-position with p-chloro-benzoyl chloride; and the resulting 1-acylate is converted to the free acetic acid derivative by a pyrolysis process. It is an object of this invention to provide a new method for obtaining this compound. It is a further object of this invention to provide new intermediates for use in this method. Other objects will become apparent hereinafter.

In accordance with this invention, it has been discovered that the 1-p-chlorobenzoyl-2-methyl-3-indolylacetic acid of Formula I can be prepared by the reduction of a compound of Formula II:

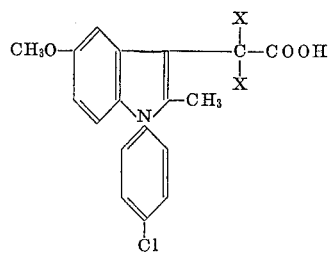

wherein X is chloro, bromo or tosyloxy, and X' is hydrogen, chloro or bromo.

The reduction process of the present invention may be carried out using any reducing reagent which is capable of removing the tosyloxy haolgen from the side chain on the 3-position without removing the chloro substituent on the 1-benzoyl group. Particularly suitable for this purpose are reducing systems such as palladium on carbon, platinum black, zinc in acid (e.g., acetic acid and hydrochloric acid), Raney nickel and the like.

The starting materials for the reduction process of the present invention are prepared by a series of reactions from p-methoxy phenylhydrazine hydrochloride and 2-(butan-3-one)malonic acid di-tertiary-butyl ester. The condensation of the hydrazine and the t-butyl ester yields a di-tertiary-butyl-2-methylindole-3-malonate of Formula III:

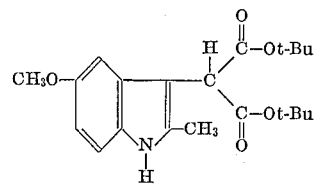

III

The compound of Formula III is 1-p-chlorobenzoylated to yield the compound of Formula IV:

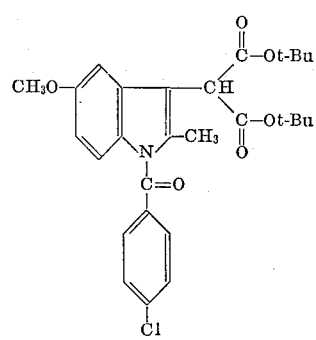

IV

The compound of Formula IV is treated with a halogen such as bromine or chlorine in a solvent such as ether to give the mono-halo derivative of Formula V:

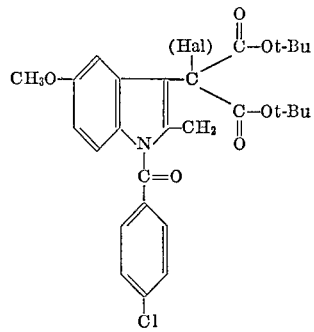

The compound of Formula V can be converted to an alpha-haloacetic acid derivative by refluxing it in a solvent medium such as toluene containing a p-toluenesulfonic acid. The refluxing is continued until the evolution of isobutylene ceases. The resulting alpha-haloacetic acid derivative is the compound of Formula II wherein X' is hydrogen and X is either chloro or bromo.

Alternatively, the compound of Formula V can be converted to the alpha,alpha-dihaloacetic acid derivative by refluxing it in toluene in the presence of p-toluene-sulfonic acid until just one equivalent of isobutylene is collected, giving a compound of Formula VI:

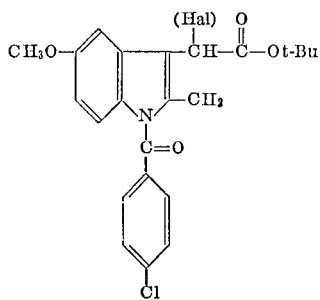

which is again halogenated by treatment with an ethereal solution of bromine or chlorine, thereby giving the alpha, alpha-dihalo-tertiary-butylacetic acid ester of Formula VII:

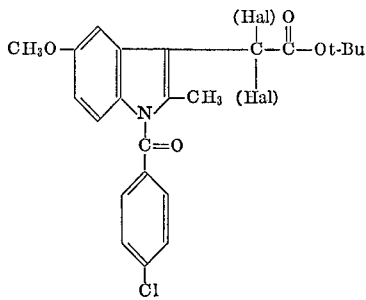

The tertiary-butyl ester of Formula VII can be converted to the alpha,alpha-dihaloacetic acid derivative (the compound of Formula II wherein X and X' are both halogen) by further treatment with p-toluenesulfonic acid in toluene as described above.

Both the alpha-halo and alpha,alpha-dihaloacetic acid derivatives thus obtained can be reduced by the process of the present invention to yield the desired compound of Formula I.

Alternatively, the alpha-haloacetic acid derivative of Formula II can be converted to the alpha-tosyloxy derivative and the latter can be reduced by the process of the present invention to give the desired compounds by sequential treatment with silver nitrate in aqueous acetone to substitute a hydroxy group for the halo group, and p-toluene-sulfonyl chloride to esterify the substituted hydroxy group. The resulting tosyloxy compound is the starting material of Formula II wherein X is tosyloxy and X' is hydrogen.

The following examples are presented to further illustrate the present invention.

EXAMPLE 1

A. A mixture of 10.0 g. of p-methoxyphenylhydrazine-hydrochloride and 10.0 g. of 2-(3-butan-3-one)malonic acid di-t-butyl ester in 100 ml. of t-butanol was refluxed for 5 hours. The t-butanol was distilled in vacuo and the residue partially dissolved in chloroform. The chloroform solution was washed with water, dried and concentrated to give di-t-butyl 2-methyl-5-methoxyindole-3-malonate.

B. A solution of 5.0 g. of di-t-butyl 2-methyl-5-methoxyindole-3-malonate in 100 ml. of dimethylformamide was added to a slurry of 10% excess sodium hydride dimethylformamide. The mixture was stirred at 0–5° C. until hydrogen evolution ceased. A 10% molar excess of p-chlorobenzoyl chloride was then slowly added. The mixture was stirred for an additional hour and the excess sodium hydride quenched with water. The mixture was diluted with a large volume of water and extracted with chloroform. The chloroform solution was dried, washed with water and concentrated to give di-t-butyl 1-p-chlorobenzoyl-2-methyl-5-methoxyindole-3-malonate.

EXAMPLE 2

To a solution of 5.0 g. of di-t-butyl 1-p-chlorobenzoyl-2-methyl-5-methoxyindole-3-malonate in ether was added a solution of 5% excess bromine in ether. This ether solution was washed with water until the washings were essentially neutral. The ether solution was then dried over magnesium sulfate, filtered and concentrated to give di-t-butyl 1 - p - chlorobenzoyl - 2 - methyl - 5 - methoxyindole-3-alpha-bromomalonate.

EXAMPLE 3

A solution of 2 g. of di-t-butyl 1-p-chlorobenzoyl-2-methyl-5-methoxyindole-3-alpha-bromomalonate in 100 ml. of toluene containing 200 mg. of p-toluenesulfonic acid was refluxed until the evolution of isobutylene ceased. The solution was washed with water, dried and concentrated to give 1-p-chlorobenzoyl-2-methyl-5-methoxyindole-3-bromoacetic acid (the compound of Formula II wherein X=bromo and X'=hydrogen).

EXAMPLE 4

To a solution of 1 g. of the product of Example 3 in acetic acid was added 200 mg. 5% palladium or carbon catalyst. The mixture was reduced until the theoretical amount of hydrogen was adsorbed. The catalyst was filtered off and the filtrate concentrated to dryness. Recrystallization from t-butanol gave substantially pure 1-p-chlorobenzoyl-2-methyl-5-methoxy-3-indolylacetic acid.

The foregoing reduction can be equivalently effected using platinum oxide catalyst in place of the palladium catalyst used therein. Likewise, the reduction can be eqiuvalently effected with zinc in acetic acid (chemical reduction).

EXAMPLE 5

A. A solution of 5.0 g. of the product of Example 2 in 100 ml. of toluene containing 100 mg. of p-toluene-sulfonic acid was refluxed until one equivalent of isobutylene was collected. The toluene was washed with water, dried and concentrated to give t-butyl 1-p-chlorobenzoyl-2-methyl-5-methoxyindole-3-bromoacetate.

B. To a solution of 5 g. of t-butyl 1-p-chlorobenzoyl-2-methyl-5-methoxyindole-3-bromoacetate in ether was added a solution of 5% excess bromine in ether. The ether solution was washed with water until the washings were essentially neutral and then it was dried over magnesium sulfate, filtered and concentrated to give t-butyl 1 - p - chlorobenzoyl - 2 - methyl - 5 - methoxyindole - 3-dibromoacetate.

C. A solution of 2 g. of the product of part B of this example in 100 ml. of toluene containing 200 ml. of p-toluenesulfonic acid was refluxed until the evolution of isobutylene ceased. The solution was washed with water and concentrated to give 1-p-chlorobenzoyl-2-methyl-5-methoxyindole-3-dibromoacetic acid.

EXAMPLE 6

To a solution of one gram of 1-p-chlorobenzoyl-2-methyl-5-methoxyindole-3-dibromoacetic acid in acetic acid was added 200 mg. of 5% palladium on carbon catalyst. The mixture was reduced until the theoretical amount of hydrogen was adsorbed. The catalyst was filtered and the filtrate concentrated to dryness. Recrystallization from t-butanol gives substantially pure 1-p-chlorobenzoyl-2-methyl-5-methoxy-3-indolylacetic acid.

The reduction of the foregoing example can equivalently be effected with other reducing catalysts such as platinum oxide; or with chemical reducing systems such as zinc in an acid such as acetic acid.

EXAMPLE 7

A mixture of 10 g. 1-p-chlorobenzoyl-2-methyl-5-methoxyindole-3-bromoacetic acid and 10 g. of finely powdered silver nitrate was stirred in 100 ml. of 50% aqueous acetone for 15 hours. The mixture was acidified with acetic acid and extracted thoroughly with chloroform. The chloroform solution was washed with water, dried and concentrated to give 1-p-chlorobenzoyl-2-methyl-5-methoxyindole-3-alpha-hydroxyacetic acid. The hydroxy acid was dissolved in pyridine and one molar equivalent of p-toluenesulfonylchloride was added. The mixture was stirred for 5 hours and the pyridine removed by vacuum distillation. The residue was dissolved in chloroform and the chloroform solution washed with water, dried and concentrated to give 1-p-chlorobenzoyl-2-methyl-5-methoxyindole-3-alpha-tosyloxyacetic acid.

EXAMPLE 8

A solution of 5 g. of the product of Example 7 in 100 ml. of ethanol was hydrogenated in the presence of 2.5 g. of Raney nickel catalyst for 14 hours. The catalyst was removed by filtration and the filtrate concentrated to dryness. Recrystallization from t-butanol afforded 1-p-chlorobenzoyl - 2 - methyl - 5 - methoxy - 3 - indolylacetic acid in substantially pure form.

The reduction process of Example 8 can be equivalently effected by the use of platinum oxide as the catalyst in place of the catalyst used in the example.

We claim:
1. A compound of the formula:

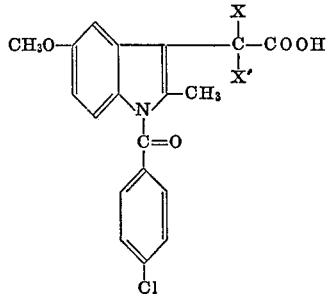

wherein X is chloro, bromo or tosyloxy and X' is hydrogren, chloro or bromo.

References Cited

UNITED STATES PATENTS 3,201,414  8/1965  Shen _____ 260—326.12

ALEX MAZEL, Primary Examiner

J. A. NARCAVAGE, Assistant Examiner

U.S. Cl. X.R.

260—45.8, 326.13